US012065985B2

(12) United States Patent
Tesson et al.

(10) Patent No.: US 12,065,985 B2
(45) Date of Patent: Aug. 20, 2024

(54) SEALING ASSEMBLY FOR A TURBINE EJECTION CONE

(71) Applicant: SAFRAN CERAMICS, Le Haillan (FR)

(72) Inventors: Thierry Guy Xavier Tesson, Moissy-Cramayel (FR); Christophe Jean François Thorel, Moissy-Cramayel (FR); Christophe Paul Aupetit, Moissy-Cramayel (FR); Thierry Jacques Albert Le Docte, Moissy-Cramayel (FR); Philippe Avenel, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 18/030,151

(22) PCT Filed: Oct. 4, 2021

(86) PCT No.: PCT/FR2021/051717
§ 371 (c)(1),
(2) Date: Apr. 4, 2023

(87) PCT Pub. No.: WO2022/074323
PCT Pub. Date: Apr. 14, 2022

(65) Prior Publication Data
US 2023/0340926 A1    Oct. 26, 2023

(30) Foreign Application Priority Data
Oct. 7, 2020   (FR) .................................... 2010228

(51) Int. Cl.
*F01D 25/30*   (2006.01)
*F02K 1/04*    (2006.01)
(Continued)

(52) U.S. Cl.
CPC ................ *F02K 1/04* (2013.01); *F01D 25/30* (2013.01); *F02K 1/805* (2013.01); *F02K 1/827* (2013.01);
(Continued)

(58) Field of Classification Search
CPC . F02K 1/827; F02K 1/805; F02K 1/04; F01D 25/30; F05D 2260/96; F05D 2240/55
See application file for complete search history.

(56) References Cited

U.S. PATENT DOCUMENTS 8,141,370 B2 *   3/2012   Bulman .................. F23R 3/007
                                                60/752
8,424,312 B2 *   4/2013   Conete .................... F01D 25/30
                                                60/796
(Continued)

FOREIGN PATENT DOCUMENTS

EP    2034136 A2    3/2009
EP    3173589 A1    5/2017
(Continued)

OTHER PUBLICATIONS

International Patent Application No. PCT/FR2021/051717 International Search Report dated Apr. 14, 2022 and English translation, 7 pages.

*Primary Examiner* — David E Sosnowski
*Assistant Examiner* — Theodore C Ribadeneyra
(74) *Attorney, Agent, or Firm* — Cozen O'Connor (57) ABSTRACT

The present invention relates to an assembly for a turbomachine turbine extending along an axis (X), comprising: —an ejection cone (100) comprising a radially outer annular wall (102) defining a flow duct for a flow of hot gases and a sound box radially arranged inside the outer annular wall (102), the sound box comprising a radially inner annular wall (104), —a connecting member (106) intended to be axially inserted between the exhaust housing and the ejection cone (100), the
(Continued)

connecting member (106) comprising an upstream annular flange (108) intended to be attached to the exhaust housing and a plurality of downstream securing tabs (110) connected to the inner annular wall (104), —an annular sealing shroud (112) comprising an upstream portion surrounding the securing tabs (110) of the connecting member (106) so as to cover the spaces circumferentially located between the securing tabs (110) and axially located between the upstream annular flange (108) of the connecting member (106) and the radially inner annular wall (104).

12 Claims, 6 Drawing Sheets (51) Int. Cl.
*F02K 1/80* (2006.01)
*F02K 1/82* (2006.01)

(52) U.S. Cl.
CPC ...... *F05D 2240/55* (2013.01); *F05D 2260/96* (2013.01)

(56) References Cited

U.S. PATENT DOCUMENTS

| | | | |
|---|---|---|---|
| 9,784,215 B2* | 10/2017 | Lu | F01D 25/243 |
| 2009/0064681 A1* | 3/2009 | Keith | F01D 25/243 60/770 |
| 2012/0160933 A1* | 6/2012 | Vauchel | F02K 1/827 239/265.11 |
| 2021/0215122 A1* | 7/2021 | Brochard | F01N 1/023 |

FOREIGN PATENT DOCUMENTS

| FR | 2654776 A1 | 5/1991 |
|---|---|---|
| FR | 3084916 A1 | 2/2020 |

* cited by examiner

SEALING ASSEMBLY FOR A TURBINE EJECTION CONE

CROSS-REFERENCE TO RELATED APPLICATIONS

This application is a U.S. National filing of International (PCT) Patent Application No. PCT/FR2021/051717 filed Oct. 4, 2021, and French Patent Application No. 2010228 filed Oct. 7, 2020, and titled "Sealing Assembly for a Turbine Ejection Cone," the entirety of which are incorporated by reference.

TECHNICAL FIELD OF THE INVENTION

The present disclosure relates to an assembly for a turbomachine turbine, such as an aircraft turbojet or turboprop engine.

PRIOR ART

A turbomachine of the bypass turbojet engine type conventionally includes, from upstream to downstream in the direction of circulation of the gases within the turbomachine, a fan, a low-pressure compressor, a high-pressure compressor, a combustion chamber, a high-pressure turbine, a low-pressure turbine and an exhaust nozzle.

The airflow entering the turbomachine is split, downstream of the fan, into a primary flow entering a so-called primary duct, and into a secondary flow, entering a so-called secondary duct. The low- and high-pressure compressors, the combustion chamber, and the high- and low-pressure turbines are located in the primary duct.

The high-pressure turbine is connected to the high-pressure compressor via a high-pressure shaft. The low-pressure turbine is connected to the low-pressure compressor and to the fan via a low-pressure shaft and possibly a gear reducer.

The exhaust nozzle, or ejection nozzle, of a turbojet engine conventionally includes an assembly allowing optimising the flow of hot gases originating from the turbine. This assembly may also have the function of absorbing at least part of the noise generated by the interaction of these hot gases with ambient air and with the flow of cold air originating from the fan.

Figure 1:
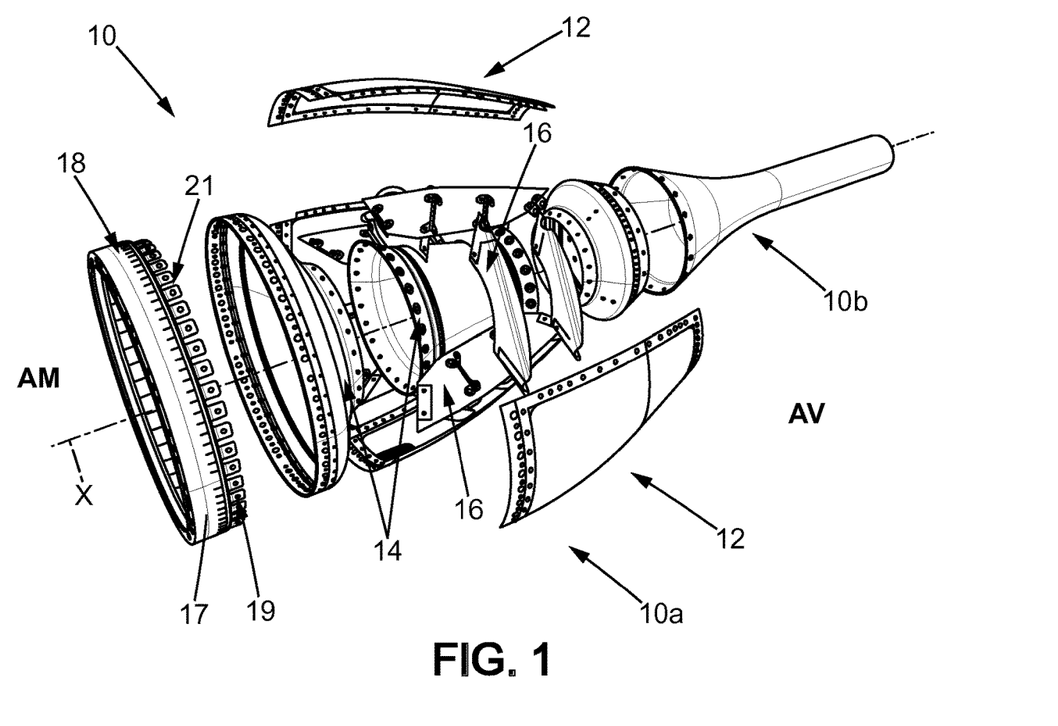
FIG. 1 is an exploded perspective view of an ejection cone of the prior art.

A portion of such an assembly, in accordance with the prior art, is illustrated in FIG. 1.

The latter extends along an axis X. The terms axial, radial and circumferential are defined with reference to the axis X. Moreover, the terms upstream and downstream are defined with respect to the direction of circulation of the gases within the turbomachinery.

This assembly includes an ejection cone 10 comprising an upstream portion 10a, with a substantially cylindrical shape, and a downstream portion 10b with a conical shape. The upstream portion 10a is formed by a radially outer annular wall 12 comprising a plurality of angular sectors connected together. The radially outer surface of the outer annular wall 12 and of the conical downstream portion 10b delimits a portion of an aerodynamic duct for the circulation of hot gases.

The upstream portion 10a comprises an acoustic box located radially inside with respect to the outer annular wall 12. The acoustic box is intended to reduce noise pollution of the exhaust gases and comprises an inner annular wall 14 and a plurality of acoustic partitions 16 arranged radially between the inner annular wall 14 and the outer annular wall 12.

The assembly also includes an exhaust housing. The upstream end of the ejection cone 10 is connected to the exhaust housing. In particular, the inner annular wall 102 and the outer annular wall 12 of the ejection cone 10 are connected to the exhaust housing by a connecting flange 18.

The connecting flange 18 includes an upstream annular portion 17 and securing tabs 19 extending axially downstream from the upstream annular portion 17. The securing tabs 19 are evenly distributed over the circumference and are spaced circumferentially apart from each other. The connecting flange 18 is connected to the exhaust housing and the securing tabs 19 are attached to the inner annular wall 14 of the ejection cone 10.

In operation, hot gases originating from the primary duct may get into the inner volume of the downstream portion 10b of the ejection cone 10, throughout the circumferential spaces 21 between the securing tabs 19. This generates a risk of deterioration of this downstream portion 10b as well as a reduction in the performances of the turbomachine.

The invention aims to overcome these drawbacks in a simple, reliable and inexpensive manner.

SUMMARY OF THE INVENTION

To this end, the invention relates to an assembly for a turbomachine turbine extending along an axis comprising:
an ejection cone comprising a radially outer annular wall delimiting a hot gas flow duct and an acoustic box arranged radially inside said outer annular wall, the acoustic box comprising a radially inner annular wall,
a connecting member intended to be inserted axially between the exhaust housing and the ejection cone, the connecting member comprising an upstream annular flange intended to be attached to the exhaust housing and a plurality of downstream securing tabs connected to the inner annular wall,
characterised in that it includes an annular sealing shroud comprising an upstream portion surrounding the securing tabs of the connecting member so as to cover the spaces located circumferentially between the tabs and axially between the upstream annular flange of the connecting member and the radially inner wall.

Thus, the annular shroud allows covering the spaces through which the flow of hot gases may infiltrate. This reduces the infiltration of the flow of hot gases into the ejection cone. Thus, the performances of the turbomachine are improved.

In the present disclosure, upstream and downstream are defined with respect to the direction of gas circulation. The terms axial, radial and circumferential are defined with respect to the axis of said assembly, which is coincident with the axis of the turbomachine. The inner annular wall is also called the radially inner wall.

The sealing shroud may be metallic. The sealing shroud may be formed from one or more sheet metal(s). The sealing shroud may be formed by a plurality of angular sectors connected together.

The sealing shroud may have a radial thickness comprised between 0.3 mm and 1 mm.

A downstream annular seal may be mounted at the downstream end of the sealing shroud and may be located radially opposite the radially inner wall.

Thus, the downstream annular seal allows filling any gap located axially between the inner wall and the sealing shroud, in particular in operation, so as to limit the influence of the effects of differentiated thermal expansion in operation.

The downstream annular seal may be formed by a braided annular element. The braided element may be made of a textile material, for example of alumino-silicate.

The downstream end of the sealing shroud may include a groove opening downstream, the downstream annular seal being mounted in said groove. The groove allows holding the downstream annular seal in position.

Said groove may have a C-like section according to a longitudinal section, according to a plane transverse to the axis of said assembly.

The groove may be located on the side of a radially outer surface of an annular main portion of the sealing shroud.

The groove may be formed, on the one hand, by the downstream end of the annular main portion of the shroud and by a distinct member attached to said downstream end of the annular main portion, for example by welding. Of course, this affixed member may be made in one-piece with the annular main portion.

The sealing shroud may be attached to the upstream annular flange of the connecting device.

Such attachment may be ensured by means of screws, rivets or any other suitable securing means.

An upstream annular seal may be mounted at the upstream end of the sealing shroud and may be located axially opposite the outer annular wall of the ejection cone.

The upstream annular seal may be formed by a braided annular element. The braided element may be made of textile, for example of alumino-silicate.

Thus, the upstream annular seal allows filling any annular gap located radially between the outer annular wall and the sealing shroud.

The upstream end of the sealing shroud may include a groove opening radially outwards, the upstream annular seal being mounted in said groove. The groove allows holding the upstream annular seal in position.

Said groove may have a C-like section according to a longitudinal section, according to a plane transverse to the axis of said assembly.

The groove may be located on the side of a radially outer surface of an annular main portion of the sealing shroud.

The groove may be formed, at least partially, by a distinct member attached to said upstream end of the annular main portion, for example by welding. Of course, this affixed member may be made in one-piece with the annular main portion.

Damping means may be mounted radially between the upstream end of the sealing shroud and the outer annular wall.

The upstream annular seal may form said damping means.

The damping means may be formed by elastically deformable tabs extending radially from the sealing shroud, the outer annular wall being able to bear on free ends of the tabs.

The damping means may be formed by elastically deformable tabs extending radially from the outer annular wall, the sealing shroud being able to bear on free ends of the tabs.

The tabs may extend axially upstream or downstream. The tabs may extend circumferentially around the axis of the assembly. The tabs can be deformed in the radial direction.

The tabs may be evenly distributed over the circumference of the sealing shroud.

The tabs may be formed by parts distinct from the rest of the sealing shroud. In this case, the tabs may be attached by bolting, riveting or brazing to the sealing shroud.

The tabs may be made in one-piece with the rest of the sealing shroud. The tabs may be formed by cutting and bending a sheet metal forming, at least partially, the sealing shroud.

The securing tabs of the connecting member may be rigid or flexible. The flexible securing tabs allow compensating for thermal expansion between the ejection cone and the exhaust housing.

The acoustic box may comprise a plurality of acoustic partitions extending radially outward from the inner annular wall of the acoustic box. The acoustic partitions may be metallic.

The inner annular wall or the outer annular wall may be made of a composite or metallic material.

The ejection cone may comprise a downstream portion, connected to the outer annular wall, made of a composite material with a ceramic matrix. The downstream portion may be conical.

The exhaust housing may be made of a metallic material.

The outer annular wall may form surface continuity with a portion of the exhaust housing so as to define a flow duct for the flow of hot gases.

A downstream portion of the inner annular wall may be attached to a downstream portion of the outer annular wall.

The present disclosure also relates to a turbine comprising an assembly as mentioned before.

DETAILED DESCRIPTION OF THE INVENTION

Figure 2:
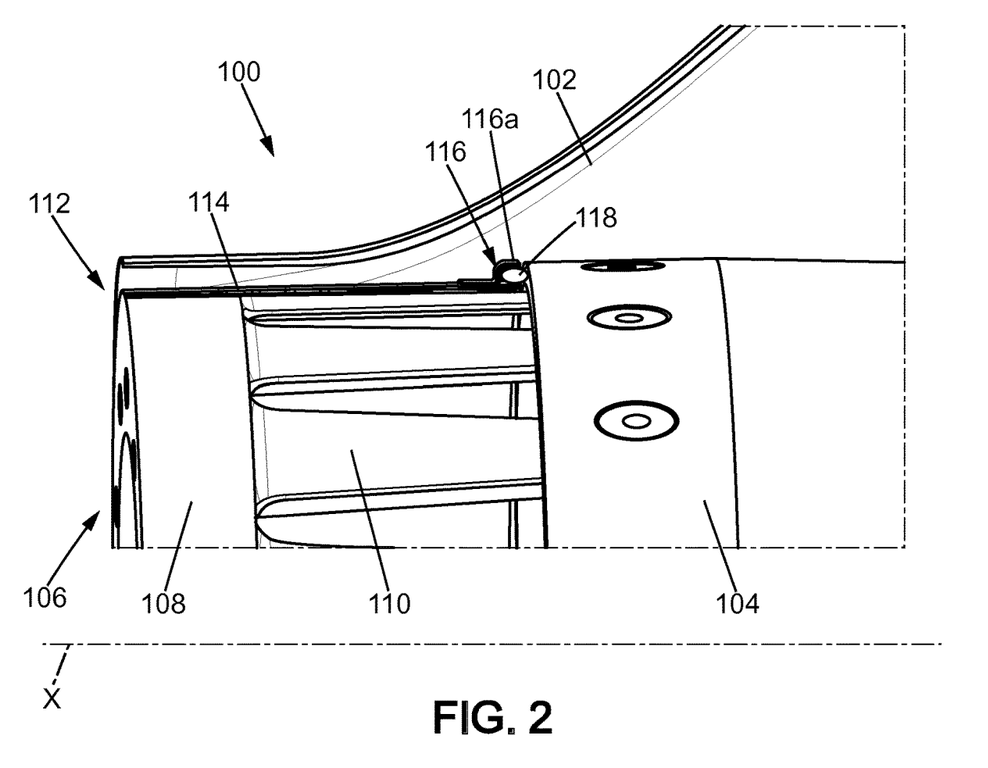
FIG. 2 is a sectional view of a portion of an assembly according to a first embodiment, wherein the downstream annular seal is illustrated in section.
Figure 3:
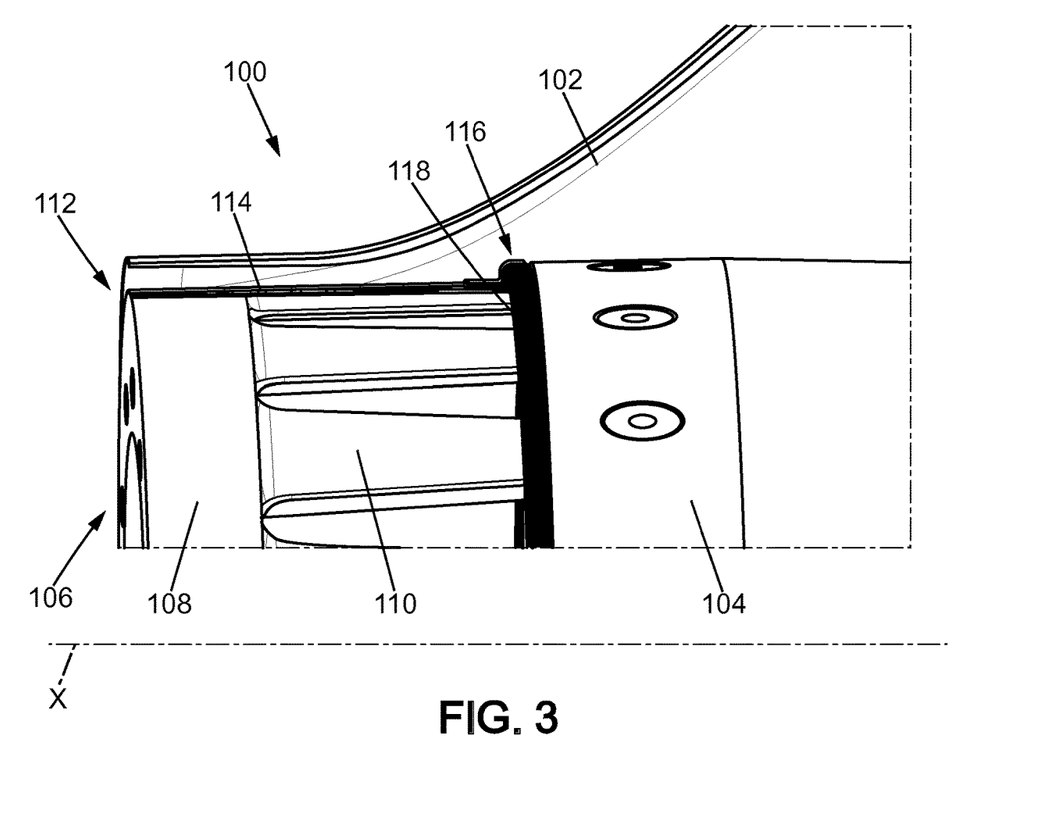
FIG. 3 is a view corresponding to FIG. 2, wherein the downstream annular seal is represented in its annular form.

FIGS. 2 and 3 represent a portion of an assembly with an axis X for a turbomachine according to a first embodiment of the invention. This assembly includes an ejection cone 100 comprising, on the upstream side, an outer annular wall 102 delimiting a flow duct for a flow of hot gases and an acoustic box arranged radially inside the outer annular wall 102. The acoustic box comprises an inner annular wall 104 arranged radially inside the outer annular wall 102 and a plurality of acoustic partitions arranged between the outer annular wall 102 and the inner annular wall 104. The assembly further includes an exhaust housing, not represented. The inner annular wall 104 of the ejection cone 100 is connected to said exhaust housing, via a connecting flange 106.

The connecting flange 106 includes an upstream annular portion 108 and securing tabs 110 extending axially downstream from the upstream annular portion 108. The securing tabs 110 are evenly distributed over the circumference and are spaced circumferentially apart from each other. The connecting flange 106 is connected to the exhaust housing and the securing tabs 110 are attached to the inner annular wall 104 of the ejection cone 100, for example by bolting.

The securing tabs 110 may be flexible or rigid.

The assembly further comprises an annular sealing shroud 112 arranged around the connecting flange 106 so as to cover the circumferential spaces between the securing tabs 110 and the axial space between the annular portion 108 and the inner annular wall 104.

Thus, the sealing shroud 112 allows avoiding the introduction of hot gases inside the inner annular wall 104, throughout the clearances or openings located circumferentially between the tabs 110.

The sealing shroud 112 may be metallic.

The upstream end of the sealing shroud 112 may be attached to the annular portion 108 of the connecting flange 106.

The sealing shroud 112 comprises an annular portion 114, for example cylindrical. The annular portion 114 has an inner shape matching the outer shape of the annular portion 108 of the connecting flange 106.

The downstream end of the sealing shroud 112 also has a downstream groove 116 opening axially downstream.

The groove 116 has a C-like section according to a longitudinal section, according to a plane transverse to X.

The groove 116 may be located on the side of a radially outer surface of the annular portion 114.

The groove 116 may be formed, on the one hand, by the downstream end of the annular portion 114 of the shroud and by a distinct member 116a attached to said downstream end of the annular portion 114, for example by welding. Of course, this affixed member 116a may be made in one-piece with the main portion 112a. According to one embodiment, a downstream annular seal 118 may be arranged in the downstream groove 116. The downstream annular seal 118 is located between the downstream end of the sealing shroud 112 and the upstream end of the radially inner wall 104.

The downstream annular seal 118 is formed by a braided annular element made of a textile material, for example of alumino-silicate.

Thus, the downstream annular seal allows filling any annular gap located axially between the inner annular wall 104 and the sealing shroud 112.

For example, the inner annular wall 104 and the outer annular wall 102 are metallic or made of ceramic matrix composite (C.M.C.) material.

The ejection cone 100 comprises a conical downstream portion connected to the outer annular wall 102. The conical downstream portion is made of a ceramic matrix composite material. The outer annular wall 102 may form surface continuity with a portion of the exhaust housing, so as to define the flow duct for the flow of hot gases.

A downstream portion of the inner annular wall 104 may be attached to a downstream portion of the outer annular wall 102.

Figure 4:
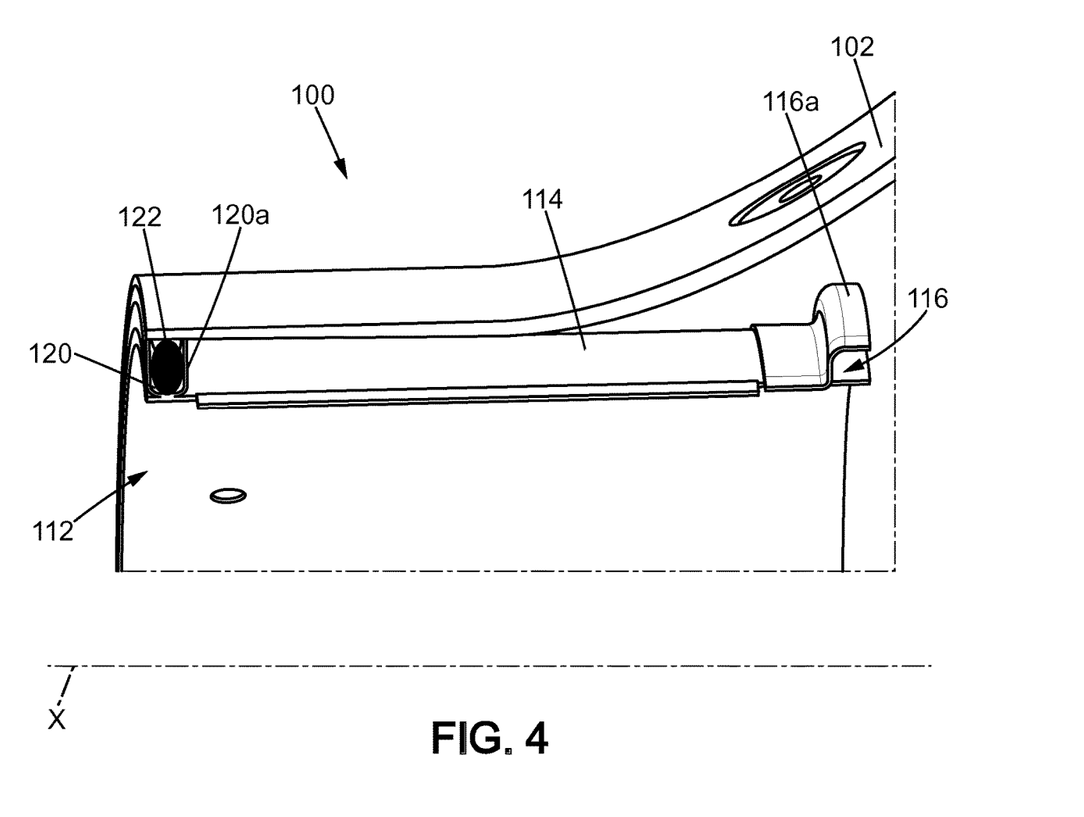
FIG. 4 is a sectional view of a portion of an assembly according to a second embodiment.

FIG. 4 illustrates an assembly according to another embodiment, which differs from that described with reference to FIGS. 2 and 3 in that the sealing shroud 112 further comprises an upstream groove 120 opening radially outwards and in which an upstream annular seal 122 is housed.

The groove 120 has a C-like section according to a longitudinal section, according to a plane transverse to X.

The groove may be located on the side of the radially outer surface of the shroud 112.

The groove may be formed by a distinct member 120a attached to the upstream end of the annular portion 114 of the shroud 112, for example by welding. Of course, this affixed member 120a may be made in one-piece with the annular portion 114.

The upstream annular seal 122 is located radially between the upstream end of the sealing shroud 112 and the outer annular wall 102 of the ejection cone 100.

The upstream annular seal 122 is formed by a braided annular element made of textile, for example of alumino-silicate.

Thus, the upstream annular seal 122 allows filling any annular gap located radially between the outer annular wall 102 and the sealing shroud 112.

The upstream annular seal 122 may be able to be deformed radially so as to dampen the radial displacements of the outer annular wall 102.

Figure 5:
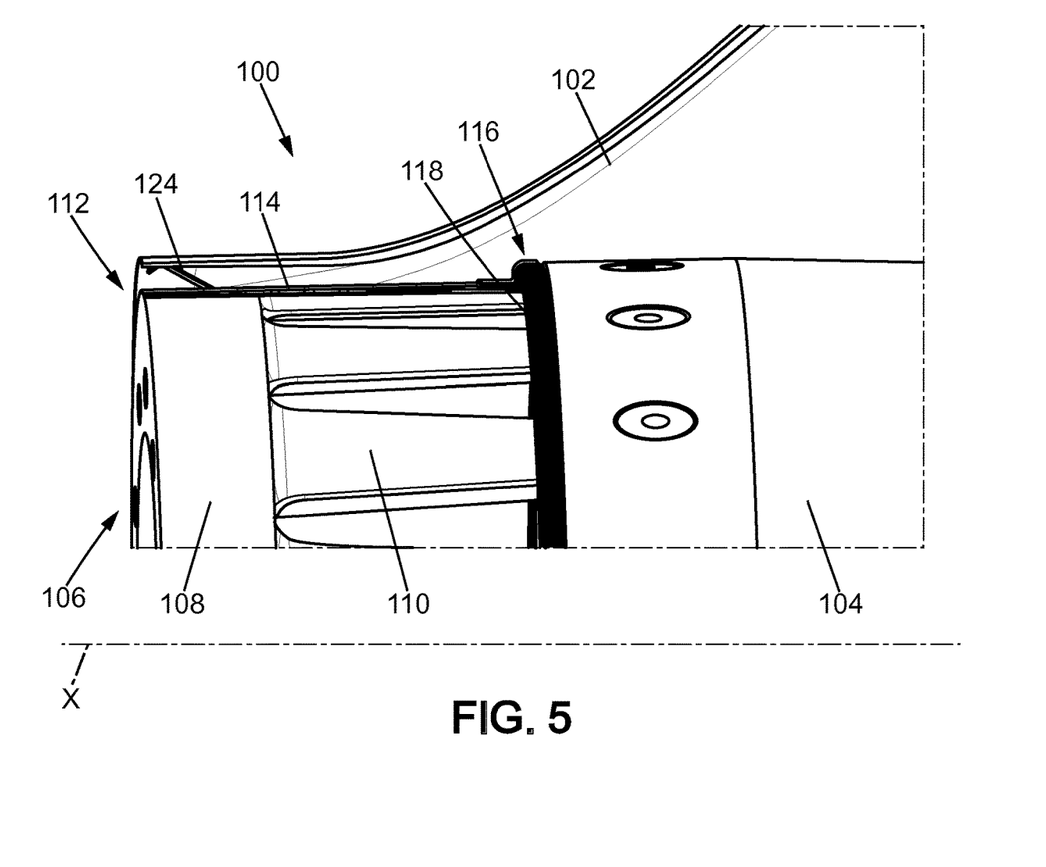
FIG. 5 is a sectional view of a portion of an assembly according to a third embodiment.
Figure 6:
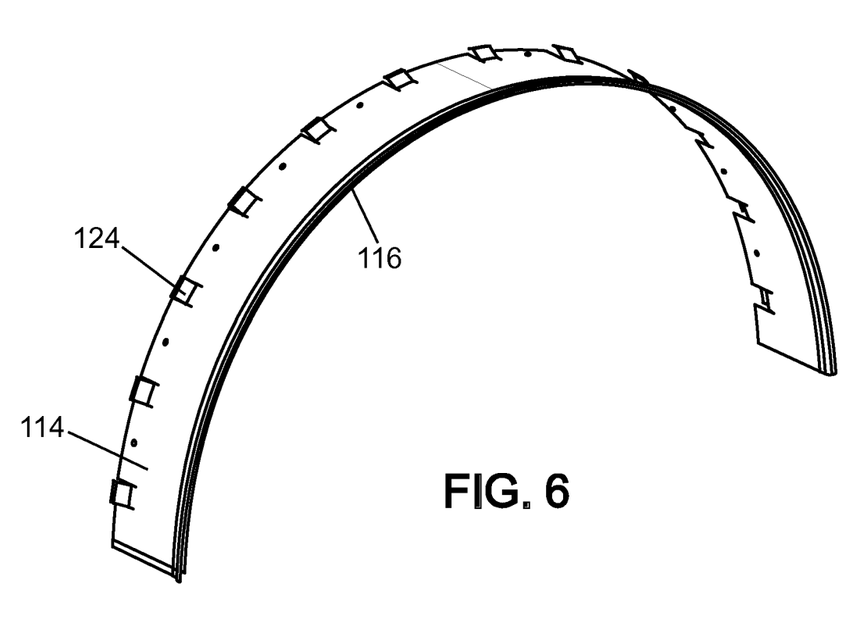
FIG. 6 is a perspective view of a sealing shroud of the assembly of FIG. 5.

FIGS. 5 and 6 illustrate another embodiment, which differs from that described with reference to FIGS. 2 and 3 in that elastically deformable tabs 124 extend radially outwards and axially upstream from the upstream portion of the annular portion 114 of the sealing shroud 112. The tabs 124 are evenly distributed over the circumference and are spaced circumferentially apart from each other.

The tabs 124 are made in one-piece with the annular portion 114 of the sealing shroud 112, for example by cutting and bending the upstream end of the annular portion 114.

The outer annular wall 102 bears on the free ends of the tabs 124, which dampen the radial displacements of the outer annular wall 102. For example, these radial displacements of the outer annular wall 102 are induced by the expansions of the upstream portion of the outer annular wall 102 due to the thermomechanical stresses to which the outer annular wall 102 is subjected. The thermomechanical stresses are partly due to the difference in materials between the conical downstream portion of the ejection cone, the outer and inner annular walls, and the exhaust housing.

The invention claimed is:

1. An assembly for a turbomachine turbine extending along an axis (X) comprising:
   an ejection cone (100) comprising a radially outer annular wall (102) delimiting a flow duct for a flow of hot gases and an acoustic box arranged radially inside said outer annular wall (102), the acoustic box comprising a radially inner annular wall (104), said acoustic box comprising a plurality of acoustic partitions extending radially outward from the inner annular wall of the acoustic box,
   a connecting member (106) inserted axially between an exhaust housing and the ejection cone (100), the connecting member (106) comprising an upstream annular flange (108) attached to the exhaust housing and a plurality of downstream securing tabs (110) connected to the inner annular wall (104),
   wherein the connecting member includes an annular sealing shroud (112) comprising an upstream portion surrounding the plurality of downstream securing tabs (110) of the connecting member (106) to cover spaces located circumferentially between the plurality of downstream securing tabs (110), the annular sealing shroud positioned axially between the upstream annular flange (108) of the connecting member (106) and the radially inner annular wall (104),
   the connecting member further comprising:
      a downstream annular seal (118) mounted at a downstream end of the sealing shroud (112) and located radially opposite the radially inner annular wall (104) of the ejection cone (100), or a upstream annular seal (122) mounted at an upstream end of the sealing shroud (112) and located radially opposite the outer annular wall (102) of the ejection cone (100).

2. The assembly according to claim 1, wherein the downstream end of the annular sealing shroud (112) includes a groove (116) opening downstream, the downstream annular seal (118) being mounted in said groove (116).

3. The assembly according to claim 2, the annular sealing shroud (112) is attached to the upstream annular flange (108) of the connecting member (106).

4. The assembly according to claim 1, wherein the upstream end of the annular sealing shroud (112) includes a groove (120) opening radially outwards, the upstream annular seal (122) being mounted in said groove (120).

5. The assembly according to claim 1, wherein damping means are mounted radially between the upstream end of the sealing shroud (112) and the outer annular wall (102).

6. The assembly according to claim 5, wherein the upstream annular seal (122) forms said damping means.

7. The assembly according to claim 5, wherein the damping means are formed by elastically deformable tabs (124) extending radially from the sealing shroud (112), the outer annular wall (102) bearing on free ends of the tabs (124).

8. A turbomachine comprising an assembly according to claim 1.

9. The assembly according to claim 5, wherein the damping means are formed by elastically deformable tabs (124) extending radially from the outer annular wall (102), the sealing shroud (112) bearing on free ends of the tabs (124).

10. The assembly according to claim 1, wherein the downstream end of the annular sealing shroud (112) includes a groove (116) opening downstream, the downstream annular seal (118) being mounted in said groove (116), the assembly further comprising damping means mounted radially between the upstream end of the sealing shroud (112) and the outer annular wall (102).

11. The assembly according to claim 10, wherein the damping means are formed by elastically deformable tabs (124) extending radially from the sealing shroud (112), the outer annular wall (102) bearing on free ends of the tabs (124).

12. The assembly according to claim 10, wherein the damping means are formed by elastically deformable tabs (124) extending radially from the outer annular wall (102), the sealing shroud (112) bearing on free ends of the tabs (124).

* * * * *